No. 845,859. PATENTED MAR. 5, 1907.
H. C. CRONEMEYER.
VALVE.
APPLICATION FILED AUG. 23, 1906.
2 SHEETS—SHEET 1.
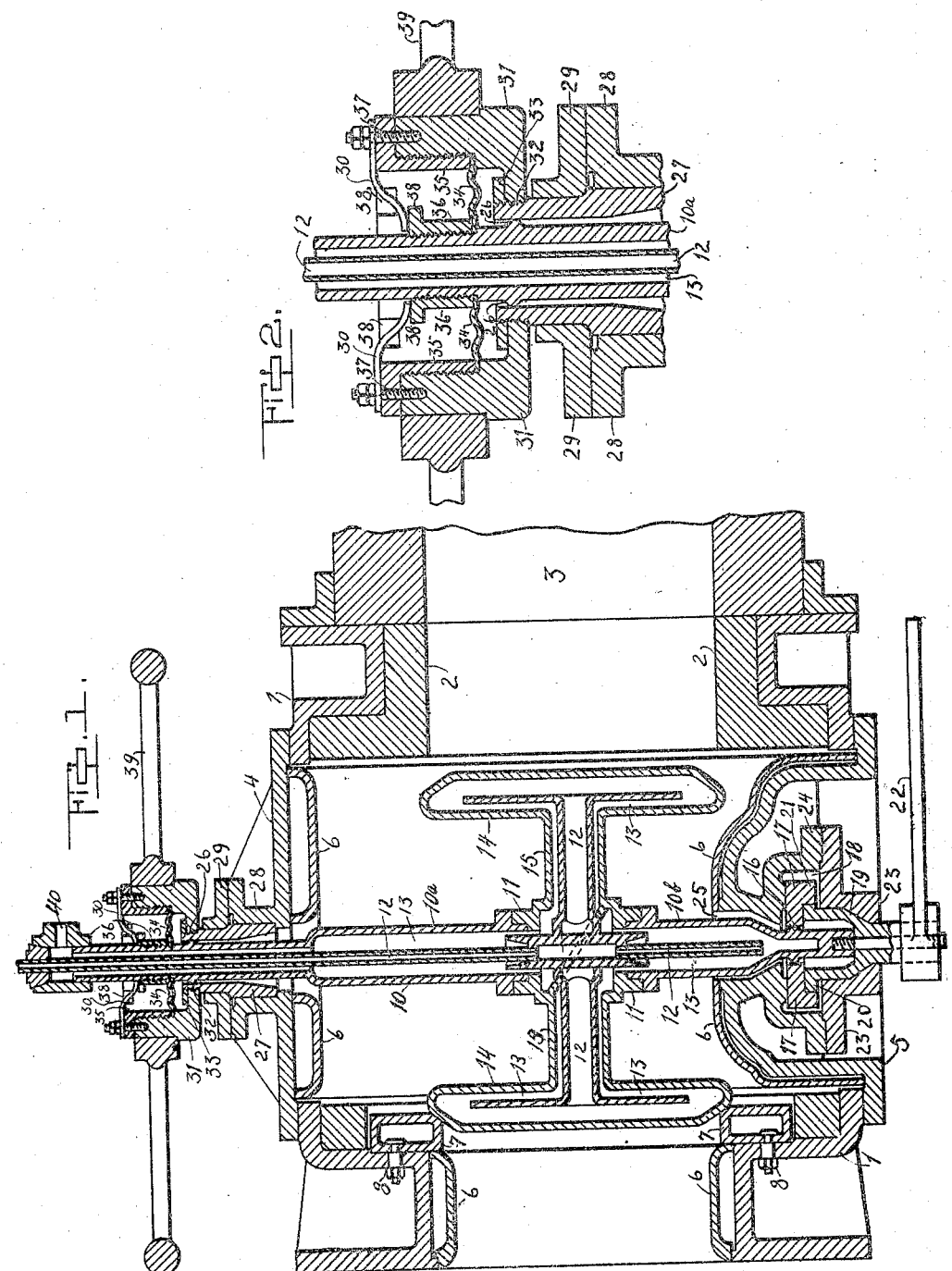
WITNESSES: Henry C. Cronemeyer INVENTOR
Atty.

No. 845,859. PATENTED MAR. 5, 1907.
H. C. CRONEMEYER.
VALVE.
APPLICATION FILED AUG. 23, 1906.
2 SHEETS—SHEET 2.
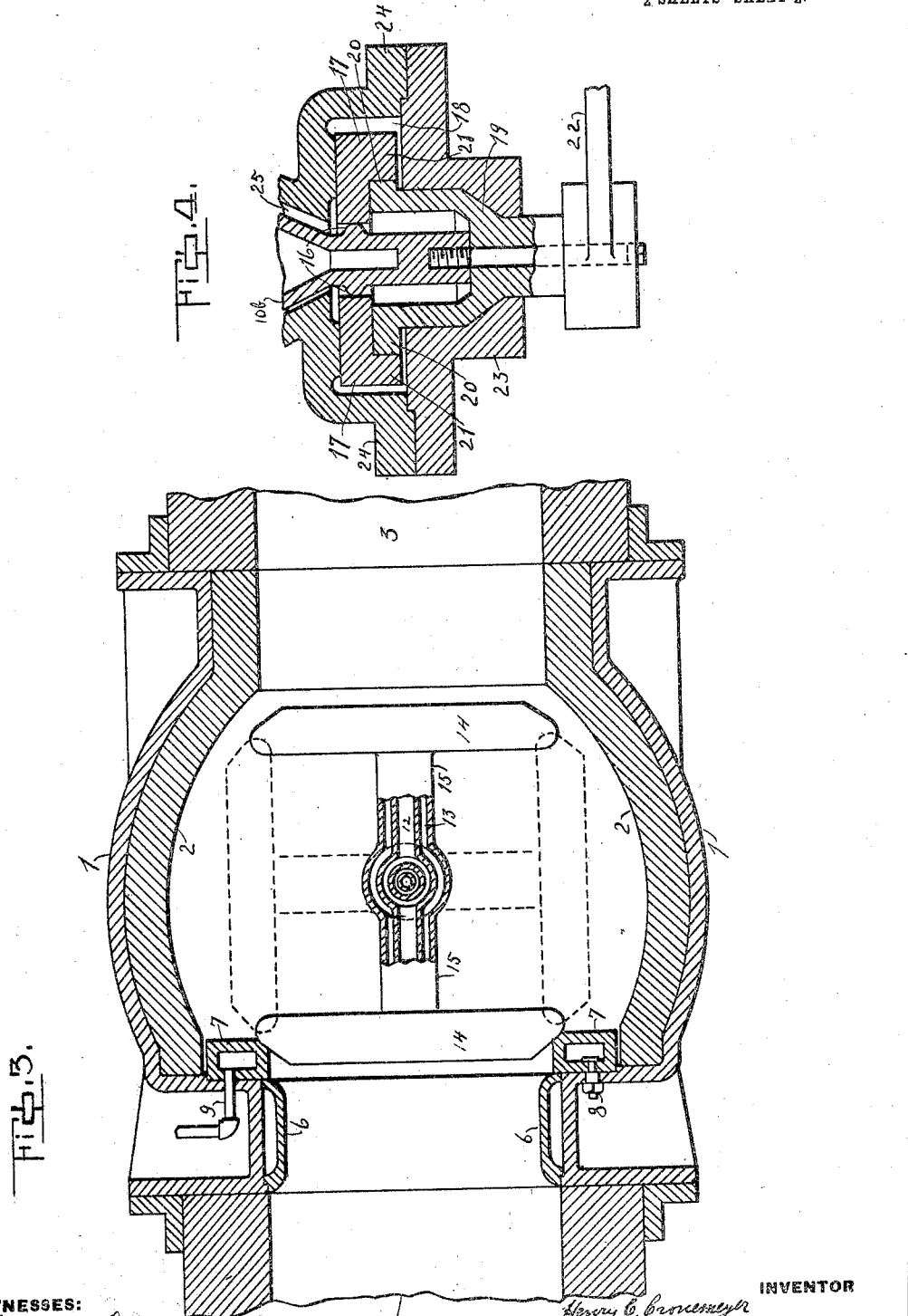
WITNESSES: INVENTOR

UNITED STATES PATENT OFFICE.

HENRY C. CRONEMEYER, OF McKEESPORT, PENNSYLVANIA.

VALVE.

No. 845,259.

Specification of Letters Patent.

Patented March 5, 1907.

Application filed August 23, 1906. Serial No. 331,702.

*To all whom it may concern:*

Be it known that I, HENRY C. CRONE-MEYER, a citizen of the United States, residing at McKeesport, in the county of Allegheny and State of Pennsylvania, have invented certain new and useful Improvements in Valves, of which the following is a specification.

My invention relates to valves, and more particularly to that class known as "hot-blast" and other valves which are subject to very high temperatures.

The object of my invention is to provide a valve which will be absolutely tight without the use of packings, which will seat accurately, and in which there will be practically no wear to the seating parts.

Another object of my invention is to provide such a valve that will effectually throttle to any degree, and a further object is to provide an improved water-cooling system to protect the working parts of the valve when subject to extremely high temperatures.

By my improved valve I secure all the advantages of the globe type of valve while avoiding the friction and incident wear of that type.

In the accompanying drawings, which form part of this specification, Figure 1 shows a sectional plan view of my improved valve. Fig. 2 is a detail of the valve-stem and its surrounding parts at the operating end. Fig. 3 is a sectional elevation of the valve, and Fig. 4 is a detail of the opposite end of the valve-stem and its coöperating parts.

Referring again to the drawings, the valve-casing 1 is lined with fire-brick or other refractory material 2 and is adapted to be connected in the hot-blast passage 3 3. End plates 4 and 5 are fastened to opposite sides of the casing 1 by bolts or other suitable means and are adapted to be readily removed for the inspection or repair of the interior of the valve. Protecting-plates 6, of cast-iron or other suitable material, afford protection from the action of the hot blast upon the otherwise exposed parts of the casing.

7 represents a hollow valve-seat held in place by bolts 8 8 and water-cooled through a suitable pipe 9.

The valve-stem 10 is divided for convenience into the two parts $10^a$ and $10^b$, united by the hub 11, and forms an inner and outer passage 12 and 13 for the circulation of the cooling-water. The valve-disks 14 14, which I prefer to employ in pairs to counterbalance and use alternately, are attached by the arms 15 to the hub 11. The valve-disks 14 and their arms 15 are made hollow and have the continuations of the passages 12 and 13.

The end $10^b$ of the valve-stem 10 has a small bead or collar 16, which rests in the circular opening in the slidable bearing-plate 17, seated in the recess 18. A bushing 19, in which the stem end $10^b$ rests, has an eccentric flange 20, engaging the projecting part 21 of the bearing-plate 17, and has the lever 22, rigidly fixed to said bushing 19. A retaining-plate 23, attached to the projecting flange 24, serves as a seat for the bushing 19 and to retain the slidable bearing-plate 17, and the bushing 19 is held in its seat by the pressure of the internal gases and, while free to turn, forms an air-tight joint. The opening 25 in the end plate 5 is sufficiently large to permit free lateral movement of the valve-stem when tilted by the eccentric bushing 19.

The opposite end $10^a$ of the valve-stem has a bead or collar 26, which serves as its bearing-surface in the bushing 27, seated in the flanged offset 28 of the end plate 4 and retained therein by the flanged collar 29. This bushing 27 permits free lateral movement of the valve-stem except at the point of bearing of the annular bead 26.

The bushing 27 is made rigid with the disk-holder 31 by means of the thread 32 and jam-nut 33. A flexible disk or diaphragm 34, which I prefer to make with concentric corrugations, unites the disk-holder 31 with the valve-stem by means of the threaded ring-nuts 35 and 36. Bolts or pins 37 are employed to prevent possible displacement of said ring-nuts 35 and 36, and suitable offsets 38 are provided for the use of a spanner-wrench in connection with said ring-nuts. A suitable hand-wheel 39 is rigidly attached to the disk-holder 31. Leaf-springs 30 exert an axial pressure on the stem 10 to counteract the upward thrust due to the internal pressure of the gas or air.

The turning of the bushing 19, with its eccentric flange 20, by means of the lever 22 in one direction carries the slidable bearing-plate 17, and with it the valve-stem, from its normal position, and the valve-disk is moved directly away from its seat without friction. The end $10^b$ of the valve-stem is shorter than the end $10^a$, and when tilted by the eccentric to disengage the valve-disk from its seat, the fixed fulcrum of the stem at the bead 26 and the flexible disk being located in close proximity to the fixed fulcrum, the tilting movement of the valve-stem at this point and the consequent flexing of the disk 34 is very minute.

After the valve-disk is removed clear from its seat movement applied to the hand-wheel turns the valve-stem and the valve-disk to any desired degree. The bushing 27 serves as the main bearing and turns with the hand-wheel and valve-stem, and the flexible corrugated disk or diaphragm prevents leakage, while permitting free tilting of the stem. The bead 26 serves only as a fulcrum-point and has no turning function.

In closing the valve the valve-disk is brought opposite its seat by the hand-wheel, and the eccentric lever then drives the valve-disk tightly against the valve-seat.

The purposes of having a pair of valve-disks are to counterbalance each other, to lengthen the serviceable life of the valve by substituting the disks alternately, and when throttling to counteract the tendency to shifting of the valve-disk by the blast.

A feature of my invention is the system of water-cooling of the valve parts. A constant supply of cold water is admitted into the inner passage 12 of the valve-stem, passes straight along said stem, impinges against the bearing portion at the eccentric end, thence it passes through the outer passage 13 to the disks and along the outer passage of the stem to the discharge connection 40.

Having thus described my invention, I claim as new and desire to protect by Letters Patent of the United States—

1. A valve consisting of a casing having a valve-seat attached thereto, a valve-disk attached to a pivotal stem, and means for shifting the axis of said valve-disk.

2. A valve consisting of a casing having a valve-seat attached thereto, a valve-disk rigidly connected with a valve-stem, means for shifting the axis of the valve-stem, and means for rotating the valve-stem and its connected valve-disk.

3. A valve consisting of a casing having a removable valve-seat therein, valve-disks attached by arms to an axial stem, means for rotating said stem, and means for shifting the axis of the valve-disks.

4. A valve consisting of a casing having a removable valve-seat therein, valve-disks rigidly attached to an axial stem, means for rotating said disks on their axis, and eccentric means for shifting the axis of the valve-disks.

5. In a valve, the combination with a casing having a detachable valve-seat therein, of a pair of valve-disks fixed radially upon an axial stem, means for moving said disks on their common axis, and auxiliary means for shifting the path of movement of said disks.

6. In a valve, the combination with a casing having a detachable valve-seat therein, of opposed valve-disks joined by arms to an axial stem mounted in said casing, means for rotating said united valve-disks on their axis, eccentric means for shifting said axis-stem, and flexible means for preventing leakage when said axial stem is tilted.

7. In a hot-blast valve, the combination with a casing having a hollow valve-seat therein, of opposed hollow valve-disks joined by tubular arms to an axial hollow stem mounted in said casing, said stem, arms, and disks forming a continuous inflow and outflow for a stream of water, means for rotating said valve-disks with their axial stem, eccentric means for shifting said axis, and flexible means for preventing leakage when said stem is tilted, substantially as described.

8. In a hot-blast valve, in combination with a valve-casing, seat, valve-disks fixed to an axial stem, and means for shifting said stem, of an inner and outer passage within said stem and valve-disks adapted to convey a continuous stream of cooling fluid so arranged that the fluid will first impinge upon the bearing parts of said stem, substantially as and for the purposes set forth.

In testimony whereof I have affixed my signature in presence of two witnesses.

HENRY C. CRONEMEYER.

Witnesses:
 JOSEPH R. IZOD,
 L. J. WILSON.